UNITED STATES PATENT OFFICE.

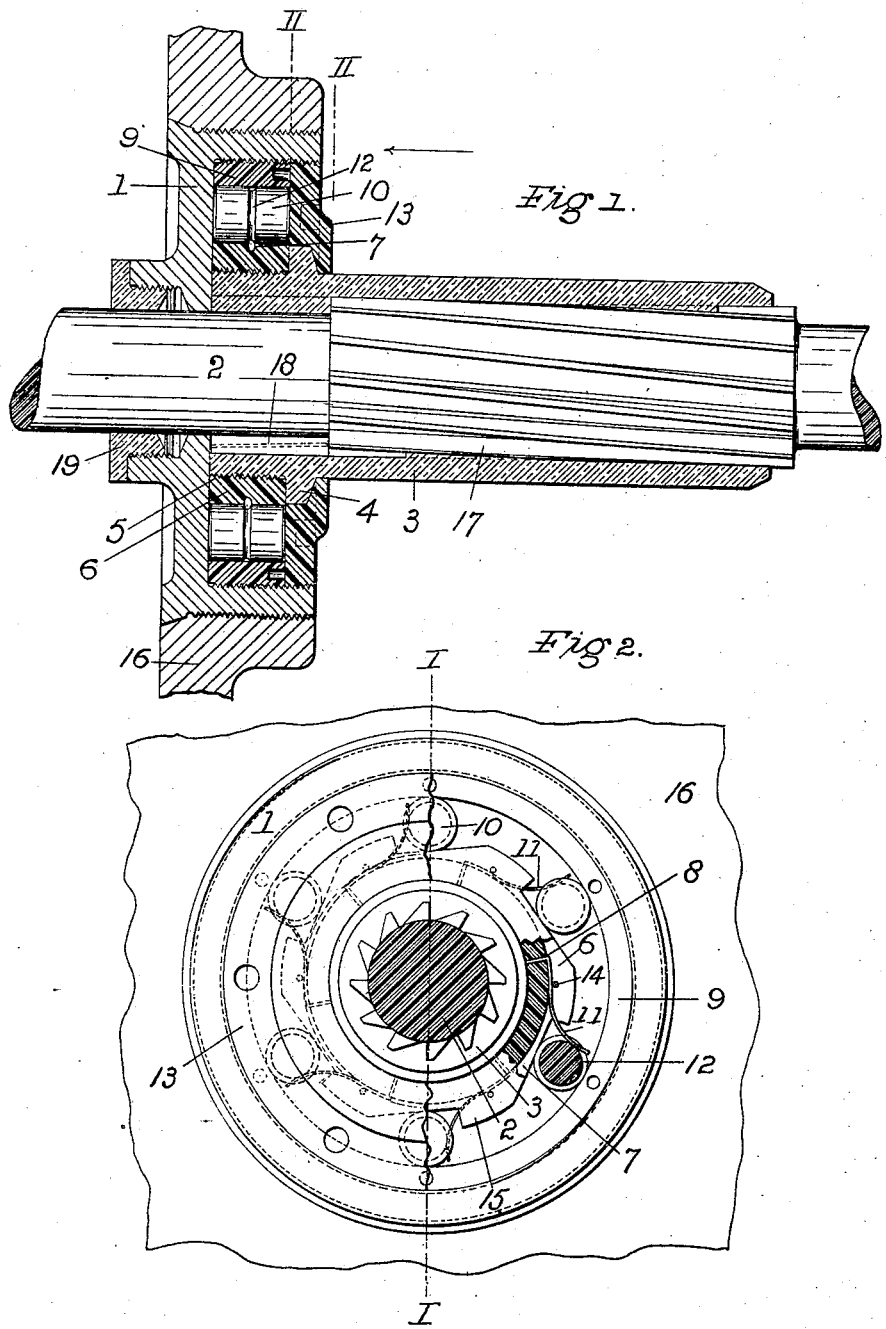

MORRIS C. WHITE, OF LOS ANGELES, CALIFORNIA, AND OTHO C. DURYEA, OF BROOKLYN, NEW YORK, ASSIGNORS TO NATIONAL GAS DRILL COMPANY, A CORPORATION OF CALIFORNIA.

CLUTCH MEANS FOR INTERMITTENTLY ROTATING A RECIPROCATING PART.

No. 855,683.  Specification of Letters Patent.  Patented June 4, 1907.

Application filed June 13, 1904. Serial No. 212,297.

*To all whom it may concern:*

Be it known that we, MORRIS C. WHITE, a citizen of the United States, residing at Los Angeles, in the county of Los Angeles and State of California, and OTHO C. DURYEA, a citizen of the United States, residing at Brooklyn, in the county of Kings and State of New York, have invented new and useful Improvements in Clutch Means for Intermittently Rotating a Reciprocating Part, of which the following is a specification.

The device is applicable for turning the mandrel or rod of a drill chuck for gas or vapor operated drills. It, or parts thereof may be used for other purposes.

Objects of this invention are strength, compactness, certainty of action, readiness of assemblage, durability and security against back lash and getting out of order.

The invention includes an improved form of roller clutch and various parts and combinations hereinafter more particularly described, and illustrated in the accompanying drawings in which—

Figure 1 is a broken view, partly in longitudinal section showing one form of the invention. Line I—I, Fig. 2 indicates the line of section. Fig. 2 is an end elevation in cross section on line II—II Fig. 1 looking left.

1 is a stationary recessed internally threaded drum, 2 an externally rifled rotary reciprocating rod or bar therein, 3 an internally rifled rotary sleeve in which the bar reciprocates, and which has an external flange 4 and threaded portion 5 in the recess of said drum.

6 is an internally threaded ratchet wheel screwed on the sleeve and against the flange and furnished with a circumferential groove 7 and with spring seats 8 in the floor of the groove.

9 is an internally smooth, externally threaded ring forming an unbroken circular runway around the ratchet wheel, screwed into the drum.

10 designates circumferentially grooved rollers in the notches of the ratchet wheel.

11 designates springs in the seats 8 and roller grooves 12.

13 is a cap screwed into the drum, encircling the sleeve and engaging the flange 4. Pins 14 inserted through the ratchet teeth 15 and across the groove 7 retain the springs in place.

16 designates a body, as an engine cylinder or the like to which the drum is fixed.

In the forms shown the rifles 17 and 18 of the rifle bar and sleeve do not extend entirely through the drum, but it is to be understood that the same may extend there-through if desired.

19 is a stuffing box which may be applied to the rod or bar 2 to prevent leakage therearound from one to the other side of the body 16.

In constructing the clutch the ratchet wheel 6 is preferably made of hardened steel and screwed onto the sleeve, tight against the flange 4. The ring 9 is screwed tightly into the drum. The springs being fastened in place, the sleeve will be inserted into the drum. Then the rollers will be inserted into the notches of the ratchet wheel, the springs being bent outward for that purpose and then allowed to come into the grooves 12. Then the cap 13 will be screwed into place and the roller ratchet thus completed is adapted for any use desired; either the drum or the sleeve being used as the fixed member according to the requirements of the work in hand. The cap 13 retains the sleeve, the ratchet and the rollers in place in the drum.

It will be seen that when the parts are assembled, the drum 1, ring 9, cap 13, and ratchet-wheel 6 completely inclose rollers 10 making a suitable runway for said rollers, the drum 1 and cap 13 fitting close to, but not tightly against, the ends of the rollers.

When the entire device illustrated is to be used then care is taken that the screw threads of the several parts will run in a direction to tighten under stress of the rifle bar.

In practical use the rollers are spring pressed against the inclines and all slack is constantly taken up so that although the ratchet will turn with perfect freedom in one direction relative to the drum, it is instantly engaged with the drum upon any reverse movement.

It is to be understood that the invention is not exclusively limited to use with a rifled sleeve and bar and that the ratchet and drum may be connected to elements different from those illustrated.

The circumferential groove cuts through the several teeth of the ratchet wheel and, together with the grooves in the rollers, chambers the springs in a most satisfactory manner; allowing very free play of the springs for holding the rollers appropriately in the notches between the teeth.

It is to be understood that we do not limit the invention to the precise construction shown, but that changes therein, such as may be made by workmen skilled in the art to which the invention pertains, come within the scope of the invention as defined in the claims.

Having described our invention, what we claim and desire to secure by Letters Patent of the United States is:

1. A stationary internally threaded drum; an externally rifled rotary reciprocating bar therein; an internally rifled rotary sleeve in which the bar reciprocates, said sleeve having an external flange and a threaded portion in said drum; an internally threaded ratchet wheel screwed on the sleeve and furnished with a circumferential groove and with spring seats in the floor of said groove; an externally threaded ring around said ratchet wheel, screwed into the drum; circumferentially grooved rollers in the notches of the wheel; springs in said seats and roller grooves; a cap screwed into said drum, encircling said sleeve and engaging said flange; and pins to retain the springs in place.

2. In a clutch the combination of a rifle bar; a rifle sleeve around the rifle bar; a circumferentially grooved ratchet wheel mounted on said sleeve to turn therewith; circumferentially grooved rollers in the notches of the ratchet wheel; a ring or circular runway around the ratchet wheel and rollers, and springs seated in the groove of the ratchet wheel and engaging in the grooves of the rollers.

3. In a clutch the combination of a drum, a ratchet wheel and an unbroken circular runway therein, spring pressed rollers in the drum between the ratchet wheel and runway, a cap for retaining the ratchet wheel and rollers in the drum, a rifle sleeve carrying the ratchet wheel and turning therewith, and a rifle bar within said sleeve.

4. The combination of a rifle bar; a flanged rifle sleeve around the rifle bar; a ratchet wheel fixed thereon; spring pressed rollers in the notches of the wheel; a recessed drum and an unbroken circular runway and a cap securing the flanged sleeve, ratchet wheel and rollers in the drum.

5. A recessed drum having an unbroken circular runway therein; a ratchet wheel inside the runway; spring pressed rollers in the notches of the wheel; means for retaining the ratchet wheel and rollers in the drum, a rifle sleeve extending through the drum and turning therewith, and a rifle bar within said sleeve.

6. The combination of a rifle bar, a sleeve around the rifle bar and furnished with projections entering the rifles of said bar, a ratchet wheel fixed on said sleeve, rollers in the notches of the wheel, a recessed drum and an unbroken circular run-way, and a cap securing the sleeve, a ratchet wheel and rollers in the drum.

7. The combination of a roller clutch having grooved teeth and grooved rollers and springs in the grooves of said teeth and rollers, with a rifled sleeve and a rod having rifles engaging the rifles of said sleeve.

In testimony whereof we have signed this specification in the presence of subscribing witnesses at the places and dates as follows:

Los Angeles California June 7th 1904.
               MORRIS C. WHITE.
Witnesses:
   FREDERICK B. LYON,
   BESSIE GEE.

Brooklyn, New York May 17, 1904.
               OTHO C. DURYEA.
Witnesses:
   JAMES R. TOWNSEND,
   ATINA B. C. DURYEA.